US010783099B2

(12) United States Patent
Sotriffer et al.

(10) Patent No.: US 10,783,099 B2
(45) Date of Patent: Sep. 22, 2020

(54) PROVISION OF INFORMATION REGARDING ADDITIONAL FUNCTIONALITIES OF FIELD BUS COMPONENTS

(71) Applicant: Endress+Hauser Process Solutions AG, Reinach (CH)

(72) Inventors: Ingomar Sotriffer, Gundelfingen (DE); Michael Mayer, Oberwil (CH); Jan Pflug, Basel (CH)

(73) Assignee: Endress+Hause Process Solutions AG, Reinach (CH)

( * ) Notice: Subject to any disclaimer, the term of this patent is extended or adjusted under 35 U.S.C. 154(b) by 0 days.

(21) Appl. No.: 16/347,218

(22) PCT Filed: Oct. 10, 2017

(86) PCT No.: PCT/EP2017/075780
§ 371 (c)(1),
(2) Date: May 3, 2019

(87) PCT Pub. No.: WO2018/082872
PCT Pub. Date: May 11, 2018

(65) Prior Publication Data
US 2019/0258596 A1 Aug. 22, 2019

(30) Foreign Application Priority Data
Nov. 3, 2016 (DE) .................. 10 2016 120 972

(51) Int. Cl.
*G06F 13/20* (2006.01)
*H04L 12/24* (2006.01)
(Continued)

(52) U.S. Cl.
CPC ......... *G06F 13/20* (2013.01); *G05B 19/0426* (2013.01); *G05B 19/056* (2013.01);
(Continued)

(58) Field of Classification Search
None
See application file for complete search history.

(56) References Cited

U.S. PATENT DOCUMENTS 6,098,116 A * 8/2000 Nixon ................ G05B 19/0426
709/220
6,850,252 B1 * 2/2005 Hoffberg ............ G06K 9/00369
348/E7.061
(Continued)

FOREIGN PATENT DOCUMENTS

DE 102007035158 A1 1/2009
WO 2007121218 A2 10/2007

OTHER PUBLICATIONS

International Search Report for Patent Application No. PCT/EP2017/075780, WIPO, dated Jan. 24, 2018, 11 pp.

*Primary Examiner* — Michael Sun
(74) *Attorney, Agent, or Firm* — Kelly J. Smith; Endress+Hauser (USA) Holding Inc.

(57) ABSTRACT

The present disclosure relates to a framework application for device access software. The framework application can be installed on a host. At least one driver can be integrated into the framework application, said driver being designed for access to an associated field bus component of a field bus network. For each integrated driver, the framework application has a standard interface, via which data can be exchanged between the driver and the framework application. For at least some of the integrated drivers, the framework application has one or more proprietary interfaces in addition to the standard interface, via which proprietary interfaces data can be exchanged between the respective drivers and the framework application. Information regarding additional functionalities that are supported by the driver (Continued)

or by an associated field bus component can be transferred from the driver to the framework application via at least one of the proprietary interfaces.

18 Claims, 5 Drawing Sheets

(51) Int. Cl.
  *H04L 29/08* (2006.01)
  *G05B 19/05* (2006.01)
  *G05B 19/418* (2006.01)
  *G05B 19/042* (2006.01)
  *G06F 40/40* (2020.01)

(52) U.S. Cl.
  CPC ....... *G05B 19/41845* (2013.01); *G06F 40/40* (2020.01); *H04L 41/22* (2013.01); *H04L 67/10* (2013.01); *G05B 2219/25428* (2013.01); *G05B 2219/31121* (2013.01); *G05B 2219/31132* (2013.01); *G05B 2219/32144* (2013.01); *Y02P 90/16* (2015.11); *Y02P 90/18* (2015.11)

(56) References Cited

U.S. PATENT DOCUMENTS

| | | | |
|---|---|---|---|
| 2006/0136622 A1* | 6/2006 | Rouvelin | H05K 5/0021 |
| | | | 710/62 |
| 2009/0049207 A1 | 2/2009 | Reynolds et al. | |
| 2009/0292995 A1* | 11/2009 | Anne | H04L 12/413 |
| | | | 715/736 |
| 2010/0094981 A1* | 4/2010 | Cordray | H04L 41/20 |
| | | | 709/222 |
| 2017/0006135 A1* | 1/2017 | Siebel | G06F 9/5072 |
| 2018/0225230 A1* | 8/2018 | Litichever | G06F 21/56 |
| 2019/0174208 A1* | 6/2019 | Speicher | G06F 1/163 |

* cited by examiner

|  | Internet of Things | HeartBeat | Envelope |
|---|---|---|---|
| Field device 103 | x (+) | - | - |
| Gateway 104 | x (+) | - | - |
| Field device 106 | - | x (-) | - |
| Field device 107 | x (+) | - | x (+) |

Fig. 4

PROVISION OF INFORMATION REGARDING ADDITIONAL FUNCTIONALITIES OF FIELD BUS COMPONENTS

CROSS-REFERENCE TO RELATED APPLICATIONS

The present application is related to and claims the priority benefit of German Patent Application No. 10 2016 120 972.4, filed on Nov. 3, 2016 and International Patent Application No. PCT/EP2017/075780 filed on Oct. 10, 2017, the entire contents of which are incorporated herein by reference.

TECHNICAL FIELD

The invention relates to a framework application for device access software. The invention furthermore relates to a method for obtaining information regarding additional functionalities of fieldbus components of a fieldbus network or of their drivers, as well as a method for scanning a fieldbus network and for obtaining information regarding additional functionalities of fieldbus components of a fieldbus network or of their drivers.

BACKGROUND

Multiple field devices serving to detect and/or influence process variables are used in automation technology. Examples of field devices of this type are fill-level measurement devices, mass flow meters, pressure and temperature measurement devices, etc., which, as sensors, record the corresponding process variables, fill-level, flow rate, pressure, and temperature.

The parameterization, configuration, and state monitoring of the field devices of a fieldbus network normally take place by means of device access software installed on a host. The device access software normally comprises a framework application into which a plurality of drivers are integrated. The components of the fieldbus network may be accessed by means of the drivers. The user may thereby make inputs from the host via the user interfaces of the drivers integrated into the framework application, and set or modify parameter values.

SUMMARY

It is an aim of the invention to enable a better overview of a fieldbus network and its components on the part of the framework application.

This aim is achieved by the features indicated in claims 1, 17, and 18.

Advantageous developments of the invention are specified in the dependent claims.

A framework application for device access software corresponding to the embodiments of the invention can be installed on a host, wherein at least one driver that is designed for access to an associated fieldbus component of a fieldbus network can be integrated into the framework application. For each integrated driver, the framework application has a standard interface via which data can be exchanged between the driver and the framework application. In addition to the standard interface, with regard to at least some of the integrated drivers, the framework application has one or more proprietary interfaces via which a data exchange may take place between the respective driver and the framework application, wherein information regarding additional functionalities that are supported by the driver or an associated fieldbus component can be transmitted from the driver to the framework application via at least one of the proprietary interfaces. The framework application is designed to merge the information regarding additional functionalities.

In the framework application, in addition to the standard interface, one or more proprietary interfaces are provided between the framework application and at least some of the integrated drivers. While only certain data may be transmitted via the standard interface, the additionally provided proprietary interfaces may be used for transmitting supplementary information. For example, information regarding additional functionalities of a fieldbus component, or of its drivers, may be transmitted to the framework application via the proprietary interfaces. In addition to the data which can be transmitted by default via the standard interface, it is thereby enabled to transmit information about the additional functionalities available on the part of the field devices and fieldbus components via the proprietary interfaces to the framework application, and to merge said information there. Because additional data transfer paths are provided between the drivers and the framework application, the constraints imposed on the data transmission via the standard interface may be overcome. For example, with a standard interface based upon the FDT standard, such restrictions are often perceived as limiting.

On the part of the framework application, the information relating to the additional functionalities supported by the individual fieldbus components is combined to form a comprehensive overview of the fieldbus network. The user is informed of the possibilities of his system and, in particular, may also recognize and assess the possibilities which would be offered to him by the functionalities of the fieldbus components which have not yet been activated. Such a comprehensive overview of supported additional functionalities such as device function tests, connectivity to the cloud, equipment for certain security levels, special data analysis functions, etc., was previously not possible. Such a comprehensive overview of the fieldbus network and its possibilities is, in particular, also of interest to sales staff, because appropriate proposals and bids for activating useful additional functionalities may be created using this comprehensive overview.

For example, the merging of information regarding additional functionalities on the part of the framework application is particularly advantageous if the framework application can be connected to a cloud. The supported additional functionalities may be uploaded to the cloud together with other data so that a comprehensive overview of the system is available from the cloud. An activation of additional functionalities may then also take place from the cloud. The time-consuming activation of additional functionalities on-site, and thus at the location of the field device, may thereby be replaced by an activation from the cloud.

A method according to the embodiments of the invention serves for obtaining information regarding additional functionalities of fieldbus components of a fieldbus network, or of their drivers, from a framework application. Together with at least one driver integrated into the framework application, the framework application is installed on a host which is engaged in a data connection with a fieldbus network, wherein the at least one driver is respectively designed for access to an associated fieldbus component of the fieldbus network. For each integrated driver, the framework application has a standard interface via which data can be exchanged between the driver and the framework application. The method comprises requesting information regarding additional functionalities of a fieldbus component or of its drivers from the framework application. The method moreover comprises transmitting the information regarding additional functionalities of the fieldbus component, or of its drivers, from the driver of the fieldbus component to the framework application via at least one proprietary interface which is provided in addition to the standard interface between the driver and the framework application.

A method according to the embodiments of the invention serves for the scanning of a fieldbus network to obtain information regarding additional functionalities of fieldbus components of a fieldbus network, or of their drivers, from a framework application. Together with at least one driver integrated into the framework application, the framework application is installed on a host which is engaged in a data connection with a fieldbus network, wherein the at least one driver is respectively designed for access to an associated fieldbus component of the fieldbus network. For each integrated driver, the framework application has a standard interface via which data can be exchanged between the driver and the framework application. The method comprises the scanning of a topology of the fieldbus network and determination of fieldbus components present in the fieldbus network. For at least some of the found fieldbus components, the method moreover comprises the transmission of information regarding additional functionalities of the found fieldbus component, or of its drivers, from the driver of the fieldbus component to the framework application via at least one proprietary interface which is provided in addition to the standard interface between the driver and the framework application.

BRIEF DESCRIPTION OF THE DRAWING

In the following, the invention is outlined in more detail with the aid of exemplary embodiments depicted in the drawings. Shown are:

FIG. 4 shows a matrix presentation of the additional functionalities supported by the various field devices and fieldbus components.

DETAILED DESCRIPTION

Figure 1:
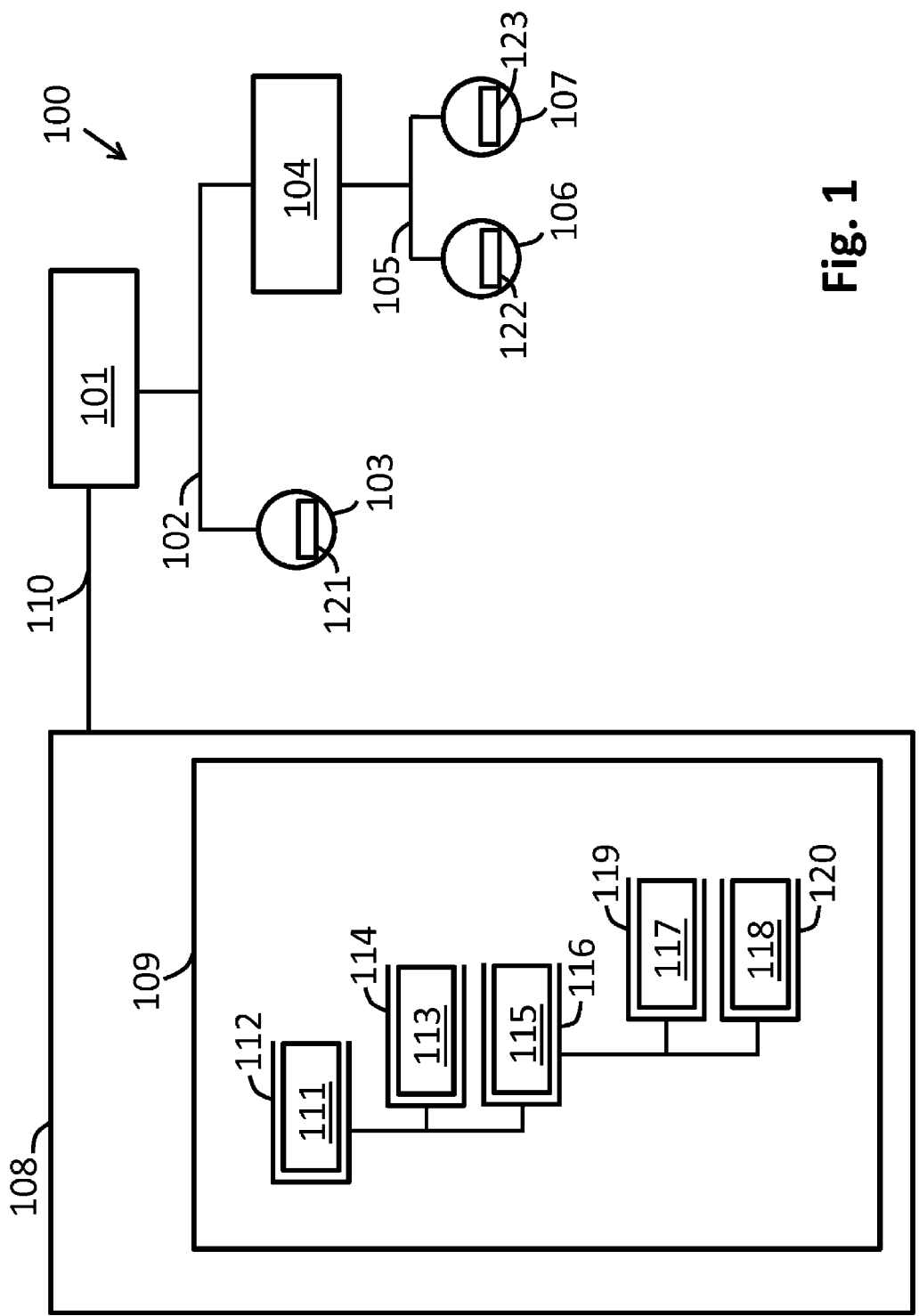
FIG. 1 shows the structure of a fieldbus network and associated device access software with drivers integrated therein.

FIG. 1 shows a fieldbus network 100 comprising a plurality of field devices and gateway devices. A field access device 101 is located at the topmost hierarchy layer of the fieldbus network 100. The field access device 101 is connected to a field device 103 and a gateway device 104 via a Profibus segment 102. The Profibus segment 102 is coupled to a HART segment 105 via the gateway device 104, wherein the gateway device 104 is designed to convert the data traffic from the Profibus protocol into the HART protocol and vice versa. The two HART field devices 106 and 107 are connected to the HART segment 105.

The parameterization, configuration, and state monitoring of the field devices of a fieldbus system take place by means of device access software 109 installed on a host 108. The host 108 is connected to the fieldbus network 100 via an Ethernet connection 110. The various components of the fieldbus system 100 may be accessed via the device access software 109. The parameters of the various components of the fieldbus system 100 may, in particular, be read out, presented, and modified from the device access software 109. Moreover, the device access software 109 enables a state monitoring (condition monitoring) of the components of the fieldbus network 110. The data exchange that is required for these tasks is normally handled via what is known as acyclical data traffic.

In order to be able to correctly address the various components of the fieldbus network 100, the device access software 109 requires information about the properties and parameters of the field devices, gateways, remote I/O's, etc., of the fieldbus network 100. This information is provided by the manufacturers of the different devices—normally in the form of device description files or device drivers. With the Profibus-DP, Profibus-PA, Fieldbus Foundation, and HART fieldbus protocols, device descriptions according to the DTM (Device Type Manager), DD (Device Description), EDD (Enhanced Device Description), and FDI Device Packages standards are used for device description for the acyclical data exchange. Especially with the EDD and DTM standards, graphical features and graphical user interfaces that are to facilitate the parameterization and configuration of the respective field device are also specified, in addition to device parameters, device functionality, and address space assignment. In the EDD standard, special graphic commands that are executed in the manner of an interpreter language are provided for generating these graphical interfaces.

In the FDT/DTM standard, the DTM's (Device Type Managers) are provided in the form of dynamically loadable libraries (DLL's) or in the form of executable files (executables). A DTM also includes said graphic features. The various DTM's regarding the various components of the fieldbus network are integrated into a common FDT framework application, wherein FDT stands for "Field Device Tool." A common framework application is thereby provided into which the DTM's regarding various devices and from different manufacturers may be integrated.

In recent years, the FDT standard has been increasingly supplemented, and later replaced, by the FDI Device Packages standard.

In addition to the Profibus, Fieldbus Foundation, and HART fieldbus protocols that were discussed in the preceding, what are known as the Industrial Ethernet protocols have been gaining in importance, to which belong the EtherNet/IP, ProfiNet, and EtherCAT fieldbus protocols, among others. In the EtherNet/IP fieldbus protocol, a device description file corresponding to the EDS (Electronic Data Sheet) standard is provided for description of both the cyclical and acyclical data exchange.

In the example of FIG. 1, the device access software 109 comprises a framework application, preferably a framework application of the FDT (Field Device Tool) standard, wherein different drivers for the various devices and components of the fieldbus network 100 may be integrated into the framework application. For example, different Device Type Managers (DTM's) from different manufacturers may be integrated into an FDT framework application. In addition to DTM's, other device description files may also be integrated into the framework application. The hierarchical structure of the field network 100 within the device access software 109 is thereby simulated with the help of drivers or device description files, wherein the arrangement of the drivers or device description files thereby corresponds to the structure of the fieldbus network 100 in mirror image. To access the components of the fieldbus network 100, for example, a number of different devices DTM's, gateway DTM's, and communications DTM's may be integrated into an FDT framework application, wherein an FDT device agent—also referred to as an FDT container—is provided on the part of the FDT framework application at each node of the fieldbus network 100. A DTM matching the respective fieldbus component is then installed within an FDT container, wherein the FDT container is then responsible for handling the communication between the FDT framework application and the DTM. The communications DTM 111, which is operated within the FDT container 112, is at the top-most position of the DTM hierarchy. The communications DTM 111 is associated with the field access device 101 and communicates with this via the Ethernet connection 110. The communications DTM 111 represents, in a certain manner, the external interface of the device access software 109. All incoming and outgoing data traffic is directed via the communications DTM 111.

The device DTM 113 is arranged below the communications DTM 111 in the DTM hierarchy. The device DTM 113 maps the functionality of the field device 103 and is executed within the FDT container 114. Moreover, a gateway DTM 115 that is associated with the gateway 104 and is operated within the FDT container 116 is arranged at the layer below the communications DTM 111. The gateway 104 may be parameterized and configured via the gateway DTM 115. Two devices DTM's 117, 118 which are executed within the FDT containers 119, 120 are arranged below the gateway DTM 115 in the DTM hierarchy. The field devices 106, 107 may be accessed via the devices DTM's 117, 118. In addition to the FDT/DTM standard, there are a variety of alternative standards for device access software and the device drivers integrated therein.

The data exchange between the FDT framework application and the DTM's integrated into the framework application takes place via the FDT standard interface, which is specified in the FDT standard. In the illustration shown in FIG. 1, this FDT standard interface is in each case provided between an FDT container and the respective DTM instantiated therein, and enables a data exchange between the FDT container belonging to the framework application and the DTM. Via this FDT standard interface, the FDT framework application can query and gather device specifications regarding the various field devices and fieldbus components of the fieldbus network 100. For example, a query with which device specifications for the respective device are queried can be directed from the FDT framework application to one of the field devices or to a fieldbus component. In response to such a request, the respective field device transmits to the FDT framework application the manufacturer ID, the device ID, the device version or device revision, the device profile or profile revision, the software version or software revision, and the protocol version or command revision, for example. These device specifications are transmitted to the FDT framework application via the FDT standard interface. Based upon this information regarding the individual devices, the FDT framework application may graphically represent to the user the hierarchical structure of the fieldbus network 100—preferably, in the form of a tree structure.

In addition to the regular functions of the field devices, manufacturer-specific additional functions, which can be activated in exchange for a payment at the field device or the associated DTM and enable added value for the user, have gained importance in recent years. These additional functionalities may, for example, be connectivity to a cloud, self-test and self-diagnosis functions, functional security functions according to the respective safety integrity level (SIL), evaluation functions such as the envelope function in fill-level measurement, easier operation such as the one-click printing, as well as different native-translated language versions in the user guide. Such additional functionalities are typically activated by purchasing an activation code. As shown in FIG. 1, such activation codes 121, 122, 123 may, for example, be stored at the respective field devices 103, 106, 107.

A first possible additional functionality that may be activated in exchange for payment is connectivity to the cloud, which is also referred to as the "Internet of Things," abbreviated as IoT. This functionality enables data to be uploaded from a DTM to the cloud via the FDT framework application. There, the data may be archived and linked to other data. For example, it is possible to upload data for flow measurement into the cloud and use them as a basis for re-orders and stock keeping. The use of the IoT connectivity is activated on the DTM side.

A further additional functionality that can be activated is the capability of performing device function checks and self-tests that are offered by Endress+Hauser under the designation, "HeartBeat." A continuous device function check without process interruption enables a documented verification of the device functionality. In the event that variations in the measurement response occur, the need for maintenance may be detected early. The activation of the functionalities for continuous device function testing takes place at the respective field device.

Moreover, the additional functionalities that can be enabled may be functionalities and device features which relate to a specific level of the safety integrity level (SIL) of the fieldbus component. Depending upon the required security level, special designs of the assemblies and the evaluation electronics are respectively required which, among other things, may also comprise a redundant design of various assemblies.

In the field of fill-level measurement by means of runtime (time-of-flight) methods, an envelope analysis may be activated as an additional functionality. An improved analysis of the measurement signal can be implemented by means of such an envelope, in particular for complex reflection signals such as occur on foaming liquids, bulk materials, suspensions, etc., for example. Since the envelope analysis is part of the control software, the activation of the envelope functionality takes place on the part of the DTM.

Another additional functionality to be cited would be "one-click printing," in which the device documentation can be printed out with a mouse click. Moreover, the additional functionalities also include various native-translated language versions for the user guide. The different language versions can each be activated at the field device.

On the part of the FDT framework application, it is desirable to have available information regarding the additional functionalities supported by the individual field devices and fieldbus components, and regarding their activation status, in order to offer the user an overview of the additional functionalities supported by the field devices of the fieldbus network 100. The information regarding the additional functionalities might then be provided to the users in an overview illustration of the fieldbus network 100. However, in the standard FDT interface defined in the FDT standard, there is no possibility of transmitting such information from a DTM to the associated FDT container.

Figure 2:
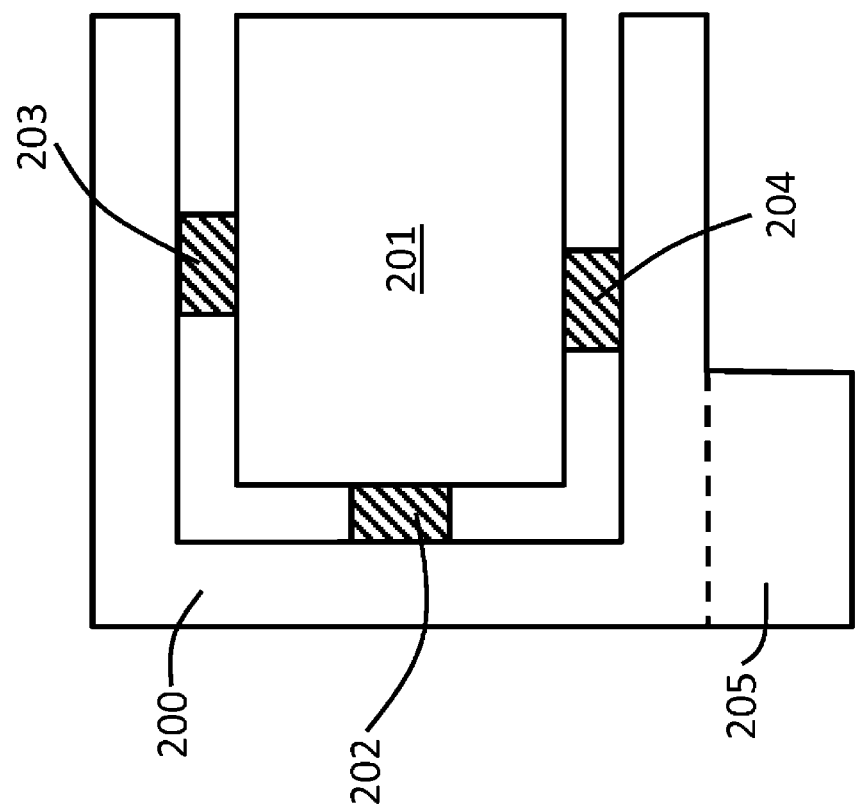
FIG. 2 shows an FDT container that communicates with an associated DTM via a standard FDT interface as well as additional proprietary interfaces.

In this regard, it is proposed that one or more additional proprietary interfaces between DTM and FDT containers be set up, which proprietary interfaces enable the transmission of information regarding supported additional functionalities and their activation status from the DTM to the FDT framework application. Shown in FIG. 2 is an FDT container 200, together with a DTM 201 instantiated within the FDT container 200. In addition to the FDT standard interface 202, additional interfaces 203, 204 are provided for data exchange between the DTM 201 and the FDT container 200. As before, device specifications are transmitted via the FDT standard interface 202 to the respective field device or the respective fieldbus component, which is accessed by the DTM 201. For example, the manufacturer ID, the device ID, the device version or device revision, the device profile or profile revision, the software version or software revision, the protocol version or command revision, etc., are transmitted via the FDT standard interface 202. By contrast, information regarding the additional functions of the respective field device or of the respective fieldbus component, as well as its activation status, may be transmitted via the one or more proprietary interfaces 203, 204. For example, information as to whether the field device or the fieldbus component, which is controlled by the DTM 201, is designed for the "HeartBeat" device function testing, and whether this functionality is activated, is transmitted via these proprietary interfaces 203, 204. Moreover, via the one or more proprietary interfaces 203, 204, further device data may also be transmitted from the DTM 201 to the FDT framework application via the FDT container 200. In particular, such data and information, whose transmission is not provided for in the FDT standard, may be transmitted from the DTM 201 to the FDT framework application. In this manner, the one or more proprietary interfaces 203, 204 may be used to transmit additional device data from the DTM 201 to the FDT framework application, in addition to the data transmittable via the FDT interface 202.

On the part of the FDT framework application, the information transmitted by the DTM 201 regarding additional functionalities may be displayed to the user, for example. Moreover, for example, a common data structure, in which the information regarding the supported additional functionalities and their activation status is stored for the entire fieldbus network 100, may be provided on the part of the FDT framework application. Moreover, for example, it is possible to upload the information regarding the additional functionalities of the individual fieldbus components and field devices from the FDT framework application into the cloud, so that all information regarding the functions supported by the fieldbus components and regarding their activation status is available in the cloud. These data may then serve as a basis for the activation of further functions of the field devices and fieldbus components in the fieldbus network 100.

The proprietary interfaces 203, 204 may also be designed for a data transmission in the opposite direction, from the FTD container 200 to the DTM 201. In this way, for example, it is possible to transmit activation commands for activating additional functionalities to the DTM's and the fieldbus components from the FDT framework application, via one of the proprietary interfaces 203, 204, and in this way to activate additional functionalities. An activation on-site may thereby be forgone. Moreover, it is possible to initiate an activation of additional functionalities from the cloud. The activation commands are then transmitted from the cloud to the fieldbus components via the FDT framework application and the proprietary interfaces 203, 204. The proprietary interfaces 203, 204 may, moreover, be used to query the functionalities supported by the FDT framework application from the DTM 201. For example, whether the FDT framework application supports IoT connectivity may be queried from the DTM 201. In this way, a mutual alignment of the respective existing functionalities is enabled between the DTM's and the FDT framework application. As a result of this alignment, the selection possibilities displayed to the user may be adapted so that, ultimately, only the actual, persistently supported functionalities are offered to the user as selectable options.

Moreover, one of the proprietary interfaces may be designed as a meta-interface that specifies which additional further interfaces are provided, and which data formats are supported by these further interfaces. For example, the interface 203 might be configured as such a meta-interface. The data exchange between DTM and FDT framework applications can be freely established by means of such an interface design.

In the FDT container 200, a memory structure 205 is preferably provided in which information is stored regarding additional functionalities of the fieldbus component controlled by the DTM 201, and the DTM 201 itself. Moreover, information regarding the activation status of these additional functionalities may be stored in the memory structure 205. In this regard, information regarding additional functionalities of the respective fieldbus component and its activation status is available to each node of the DTM hierarchy in the FDT framework application. This information may be presented to the user in the form of a comprehensive overview of the available additional functionalities. As an alternative to this solution, the information regarding the additional functionalities might also be extracted from the respective DTM 201 as necessary, without being stored on the part of the FDT framework application. For this purpose, the FDT framework application would direct a corresponding query to the DTM 201, which is thereupon booted up and transmits the required information regarding the additional functionalities of the respective fieldbus component to the FDT framework application. This information obtained from the DTM 201 may also be written into the cloud from the FDT framework application.

Figure 3:
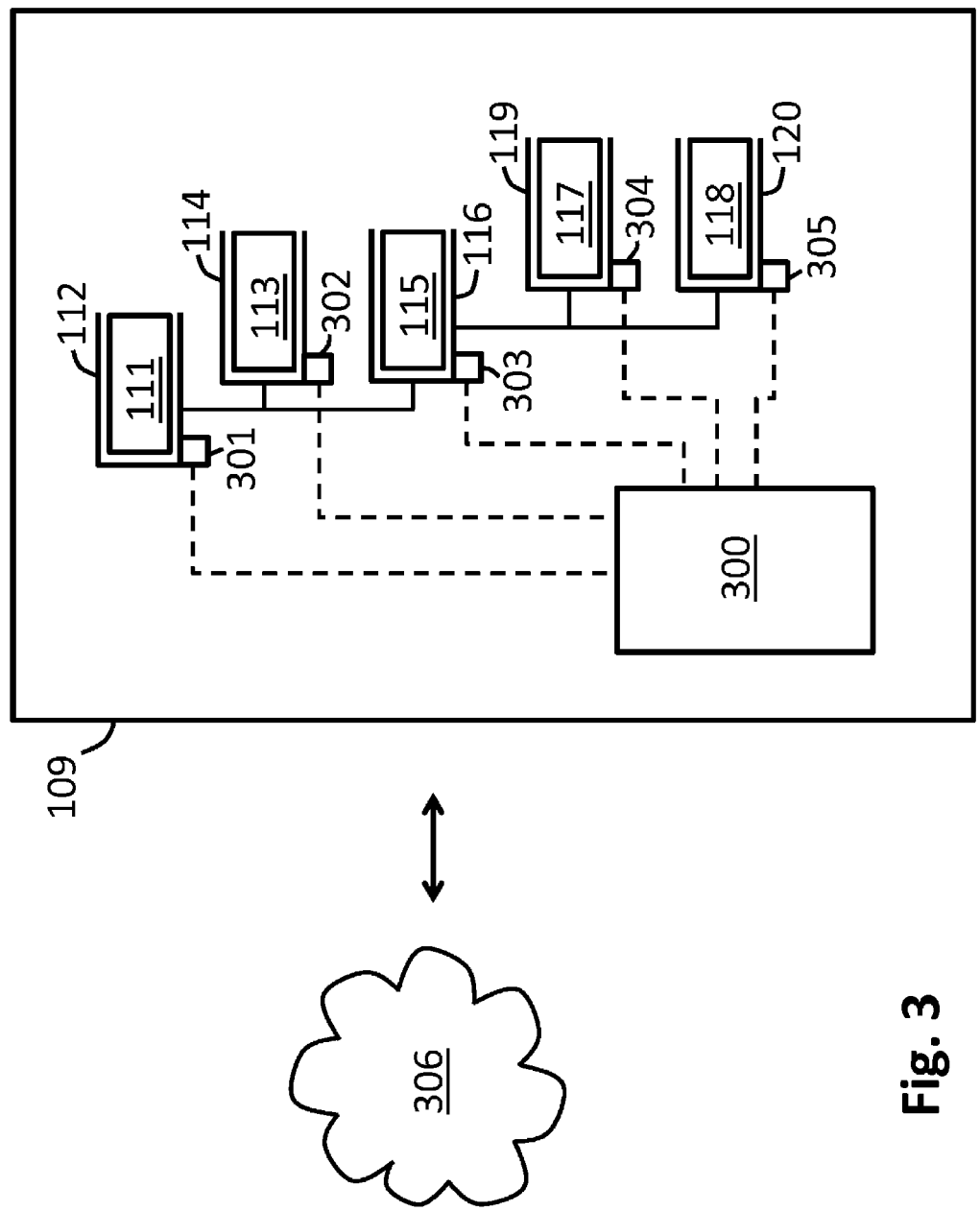
FIG. 3 shows device access software having a central component that is designed to query and merge information regarding the supported additional functionalities.

For the example given in FIG. 1, in FIG. 3, it is shown how the information about additional functionalities that is stored at the various nodes within the device access software 109 may be merged by means of a central component 300 into a comprehensive overview of the system. The information regarding the additional functionalities is in each case stored in the data structures 301 to 305, which are part of the respective FDT containers 112, 114, 116, 119, 120. The central component 300 may now access these data structures 301 to 305 and merge the information contained therein. This information regarding the additional functionalities which are supported by the field devices and fieldbus components of the fieldbus network 100 may, for example, be stored in a common data structure, wherein an associated activation status may also be stored for each additional functionality. The information regarding the additional functionalities may be uploaded from the FDT framework application as shown in FIG. 3 to the cloud 306, insofar as the FDT framework application has the IoT connectivity required for this purpose. An activation of additional required functionalities might then take place from the cloud. Moreover, the information regarding the additional functionalities may be presented to the user in the form of a comprehensive overview. Typically, the hierarchical structure of the fieldbus network 100 is represented by the FDT framework application in the form of a tree structure on a graphical user interface. Information regarding additional functionalities may, for example, be inserted into the tree structure that is presented by the FDT framework application. As an alternative to this or in addition, the information regarding additional functions and activation status may be presented in a matrix, in which the available additional functionalities and their activation status are displayed for each field device and each fieldbus component.

Such a matrix for the example shown in FIG. 1 and FIG. 3 is indicated in FIG. 4. The field devices or fieldbus components are plotted from top to bottom in this matrix, so that field device 103, the gateway device 104, the field device 106, and the field device 107 are listed in succession. By contrast, listed from left to right are the possible additional functionalities—in the present example, thus, "Internet of Things," "HeartBeat," and "Envelope." It is apparent from the matrix presentation that the field device 103 is equipped for an IoT connectivity. The plus sign thereby indicates that this functionality is also activated. The gateway device 104 likewise has an activated IoT connectivity. The field device 106 is equipped with the HeartBeat functionality for continuous device function testing, but this functionality is not activated. The field device 107 has an IoT connectivity and the possibility of envelope analysis, wherein both additional functionalities are activated.

The matrix shown in FIG. 4 affords the user an overview of the available additional functionalities. The possibilities of the existing fieldbus network 100 may thereby be recognized and utilized. Moreover, however, the matrix shown in FIG. 4 also indicates to the user which functionalities, although present, have not yet been activated. The user is thus informed about latent and under-utilized potentials of his installation and corresponding improvement and expansion possibilities, so that he may better exploit the performance potential of his installation by enabling additional functionalities. The matrix presentation shown in FIG. 4 is, in particular, also interesting for sales staff, in order to, on the basis of the functionalities supported by the individual field devices, be able to propose suitable bids for the improvement and expansion of the installation and for expansion of the functional scope. In particular, a sales staff might read off from the matrix presentation which functionalities that have not yet been activated might still be activated.

To set up the device access software 109 and to integrate the required drivers and DTM's into the FDT framework application, a scan of the entire fieldbus network 100 is preferably performed automatically or manually, wherein the device specifications of the various field devices and fieldbus components of the fieldbus network 100 are interrogated within the scope of this scanning process. The querying of the various supported additional functionalities may, in addition, be integrated into this scanning process.

Figure 5:
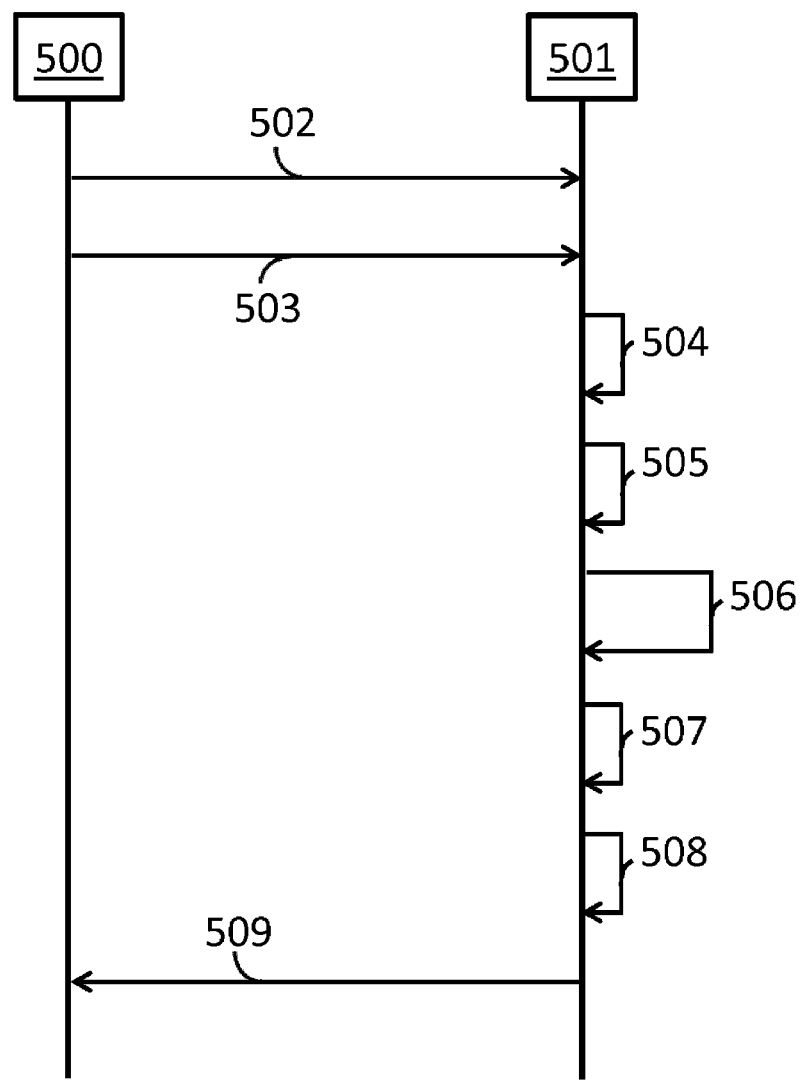
FIG. 5 shows the workflow of a scan of the entire fieldbus network, as performed by the framework application, in which, in addition to the device specifications, the supported additional functionalities are also determined.

The interaction between a user 500 and an FDT framework application 501 in the implementation of such a scan of the fieldbus network 100 is shown in FIG. 5. Initially, in step 502, the user 500 instantiates a communications DTM within the FDT framework application 501. In the next step 503, the user 500 then starts a scan of the entire fieldbus network 100. A scan of the address space of the field access devices 101 is thereby performed first. The field device 103 and the gateway device 104 are found within this address space. The device specifications of the found field device 103 and the found gateway device 104 are thereupon queried by the FDT framework application 501, which device specifications comprise, for example, one or more of the following: manufacturer ID, device ID, device version or device revision, device profile or profile revision, software version or software revision, or protocol version or command revision. The queried device specifications are transmitted to the FDT framework application 501 via the FDT standard interface 202. Using the device specifications of field device 103 and of the gateway device 104 that are determined in this way, appropriate drivers or DTM's for the two devices may then be selected on the part of FDT framework application 501. Given the selection of suitable drivers, discrepancies between driver version and device version can be tolerated to a certain extent. If suitable DTM's are found, these DTM's are inserted into the driver hierarchy of the FDT framework application 501. The DTM for the field device 103 is instantiated in step 504, and the DTM for the gateway device 104 is instantiated in step 505. The DTM's are booted up in order to subsequently query, by means of the DTM's, the additional functionalities that are supported by the field device 103 and the gateway device 104. Moreover, it can be queried from the DTM's whether these supported additional functionalities have also been activated. The information about the additional functionalities and their activation status is transmitted from the DTM's to the FDT framework application 501 via at least one of the proprietary interfaces 203, 204.

By scanning the address space of the field access device 101, the topology of the fieldbus network 100 is now known up to the gateway 104. However, the topology in the hierarchy layers below the gateway 104 is still unknown. To detect the topology below the found gateway 104, in step 506, the FDT framework application 501 triggers a scan of the address space of the gateway 104. For each found gateway device, the FDT framework application 501 may thereby be designed to automatically instantiate a scan of the address space of the gateway device. As an alternative to this, a scan of the associated address space might be manually initiated for each found gateway device. During the scanning of the address space of the gateway device 104, the two field devices 106 and 107 are found. From the FDT framework application 501, the device specifications for the two field devices 106 and 107 are thereupon queried, which device specifications are then transmitted to the FDT framework application 501 via the FDT standard interface 202. Respective suitable drivers or DTM's for the two field devices 106 and 107 are selected on the part of the FDT framework application 501. A device DTM for the field device 106 is instantiated by the FDT framework application 501 in step 507, and a device DTM for the field device 107 is instantiated in step 508. The two device DTM's are booted up in order to query, via the two device DTM's, the next additional functionalities and activation status of the two found field devices 106 and 107. The information about the additional functionalities and their activation status is transmitted from the DTM's to the FDT framework application 501 via at least one of the proprietary interfaces 203, 204.

In the most recent scan of the address space of gateway device 104, only field devices were found, but no more gateway devices. It is to this extent clear that the end of a branch of the branched fieldbus network 100 has been reached. The "leaves" of the branching tree have been reached, so to speak. After there are no further branches to be scanned in the fieldbus network 100, in step 509, the FDT framework application 501 informs the user 500 that the scanning process for the entire fieldbus network 100 has concluded. In the scanning process described above, all information regarding additional functionalities and activation status for all field devices and fieldbus components is determined and respectively transmitted via the proprietary interface to the FDT framework application, so that all information regarding additional functionalities is also available after conclusion of the scanning process.

As an alternative to this, it is possible to individually query the supported additional functionalities from a specific field device. For this purpose, the FDT framework application 501 is called and booted up from the associated DTM, which then retrieves the required information regarding additional functionalities and activation status from the associated field device, and transmits said information to the FDT framework application via at least one of the proprietary interfaces 203, 204. In this way, which additional functionalities are supported by a specific field device and which of these functionalities are activated can be queried at any time.

The invention claimed is:

1. A framework application for device access software, wherein the framework application can be installed on a host, comprising:
at least one driver configured for access to an associated fieldbus component of a fieldbus network integrated into the framework application;
a standard interface for each integrated driver, via which interface data is exchanged between the driver and the framework application; and
one or more proprietary interfaces different than the standard interface via which a data exchange takes place between the respective driver and the framework application, wherein information regarding additional functionalities that are supported by the driver or an associated fieldbus component are transmitted from the driver to the framework application via at least one of the proprietary interfaces;
wherein at least one driver includes both a standard interface and a proprietary interface for transferring data between the driver and the framework application.

2. The framework application of claim 1, wherein the framework application merges the information regarding additional functionalities.

3. The framework application of claim 1, wherein the framework application is configured to process the information regarding additional functionalities according to at least one of the following: presenting the information at least in part on a graphical user interface, storing the information at least in part in a data structure within the framework application, and uploading the information at least in part to a cloud.

4. The framework application of claim 1, wherein at least one of the following:
the framework application has at least one container component for integration of drivers, wherein a respective driver can be installed in a container component for access to an associated fieldbus component;
a respective standard interface via which data can be exchanged between the container component and the driver is provided between a container component and a driver installed in the container component; and
at least one proprietary interface via which data can be exchanged between the container component and the driver is, in each case, additionally provided between the container component and the driver installed in the container component.

5. The framework application of claim 1, wherein in the framework application an associated data structure in which information regarding additional functionalities supported by the fieldbus component or the associated driver can be stored is provided to a fieldbus component of the fieldbus network.

6. The framework application of claim 1, wherein data structures associated with a container component of the framework application of the container component, or belonging to the container component, are provided that are configured to store information regarding additional functionalities of the driver installed in the container component and regarding the associated fieldbus component.

7. The framework application of claim 1, wherein information regarding an activation status of the additional functionalities can be transmitted from a driver to the framework application via at least one of the proprietary interfaces.

8. The framework application of claim 1, wherein device specifications of the respective fieldbus component can be transmitted from the driver to the framework application via the standard interface.

9. The framework application of claim 1, wherein the additional functionalities include at least one of the following:
an additional functionality corresponding to a certain grade of the safety integrity level of the respective fieldbus component;
an additional functionality for performing device function checks;
an additional functionality for printing out documentation regarding the respective fieldbus component by means of a click;
an additional functionality for evaluating measurement signals regarding runtime measurement by means of an envelope;
an additional functionality relating to connectivity to a cloud; and
an additional functionality relating to a native-translated language version for user guidance.

10. The framework application of claim 1, wherein the framework application comprises a central component that is designed to read out and merge information about the additional functionalities.

11. The framework application of claim 1, further including at least one of the following:
the framework application is designed to merge information about additional functionalities and to present it in an overview presentation of the fieldbus network on a graphical user interface;
information regarding an activation status of the additional functionalities can be transmitted from a driver to the framework application via at least one of the proprietary interfaces, wherein the framework application is designed to present information about additional functionalities supported by the fieldbus components, together with the activation status of these additional functionalities;
the framework application is designed to present the additional functionalities supported by the fieldbus components and their activation status in the form of a matrix presentation on a graphical user interface; and
the framework application is designed to upload information about the additional functionalities supported by the fieldbus components into a cloud.

12. The framework application of claim 1, including at least one of the following:

the framework application is designed to generate an activation command, to transmit the activation command to a fieldbus component via one of the proprietary interfaces and a driver integrated into the framework application, and to activate at least one additional functionality supported by the fieldbus component; and the framework application is designed to receive an activation command from a cloud, to transmit the activation command to a fieldbus component via one of the proprietary interfaces and a driver integrated into the framework application, and to activate at least one additional functionality supported by the fieldbus component.

13. The framework application of claim 1, wherein the at least one proprietary interface comprises a meta-interface which provides information regarding the number and design of the further proprietary interfaces to the framework application.

14. The framework application of claim 1, further including at least one of the following:

information regarding a functional scope of the framework application can be transmitted from the framework application to a driver via at least one of the proprietary interfaces; and the framework application is designed to perform an adjustment of the functionalities between framework application, drivers, and fieldbus components via one or more of the proprietary interfaces.

15. The framework application of claim 1, further including at least one of the following:

the framework application is an FDT framework application;

the standard interface is the FDT standard interface;

the drivers are DTM's;

at least one of following fieldbus standards is used within the fieldbus network: Profibus, Foundation Fieldbus, HART, Industrial Ethernet;

the drivers correspond to at least one of the following standards: DD, EDD, EDS, DTM, FDI Device Packages; and the respective fieldbus component is a field device, a gateway device, or an access device.

16. A device access software, comprising:

the device access software including a framework application;

wherein the framework application includes:

at least one driver configured for access to an associated fieldbus component of a fieldbus network integrated into the framework application;

a standard interface for each integrated driver, via which interface data is exchanged between the driver and the framework application; and one or more proprietary interfaces different than the standard interface via which a data exchange takes place between the respective driver and the framework application, wherein information regarding additional functionalities that are supported by the driver or an associated fieldbus component are transmitted from the driver to the framework application via at least one of the proprietary interfaces;

wherein at least one driver includes both a standard interface and a proprietary interface for transferring data between the driver and the framework application.

17. A method for obtaining information regarding additional functionalities of fieldbus components of a fieldbus network or of their drivers from a framework application, wherein the framework application, together with at least one driver integrated into the framework application, is installed on a host that is engaged in a data connection with a fieldbus network, wherein the at least one driver is respectively designed for access to an associated fieldbus component of the fieldbus network, wherein the framework application has a standard interface for each integrated driver, via which interface data can be exchanged between the driver and the framework application, the method including steps of:

requesting information regarding additional functionalities of a fieldbus component or of their drivers from the framework application; and transmitting the information regarding additional functionalities of the fieldbus component or of their drivers from the driver of the fieldbus component to the framework application via at least one proprietary interface which is different than the standard interface and is provided in addition to the standard interface between the driver and the framework application;

wherein at least one driver includes both a standard interface and a proprietary interface for transferring data between the driver and the framework application.

18. A method for scanning a fieldbus network and for obtaining information regarding additional functionalities of fieldbus components of the fieldbus network or of their drivers from a framework application, wherein the framework application, together with at least one driver integrated into the framework application, is installed on a host that is engaged in a data connection with a fieldbus network, wherein the at least one driver is respectively designed for access to an associated fieldbus component of the fieldbus network, wherein the framework application has a standard interface for each integrated driver, via which interface data can be exchanged between the driver and the framework application, the method including steps of:

scanning a topology of the fieldbus network and determining fieldbus components present in the fieldbus network; and for at least some of the found fieldbus components, transmitting information regarding additional functionalities of the found fieldbus component or of their drivers from the driver of the fieldbus component to the framework application via at least one proprietary interface which is different than the standard interface and is provided in addition to the standard interface between the driver and the framework application;

wherein at least one driver includes both a standard interface and a proprietary interface for transferring data between the driver and the framework application.

* * * * *